Patented Jan. 1, 1952

2,581,009

UNITED STATES PATENT OFFICE 2,581,009

METHOD OF PREPARING THIOPHENE-ALDEHYDES

William S. Emerson and Tracy M. Patrick, Jr., Dayton, Ohio, assignors to Monsanto Chemical Company, St. Louis, Mo., a corporation of Delaware No Drawing. Application August 24, 1948, Serial No. 45,985

5 Claims. (Cl. 260—332.3)

This invention relates to new methods of preparing thiophenealdehydes and substituted thiophenealdehydes. More particularly, this invention relates to a new method of preparing an intermediate useful in the synthesis of a wide variety of thiophene derivatives.

Thiophenealdehyde has been prepared by a variety of methods, but most of them are tedious or otherwise objectionable. The most practicable methods involve either the oxidation of 2-acetothienone to 2-thienylglyoxylic acid, followed by decorboxylation, or the reaction of 2-thenyl chloride with hexamethylene tetramine, but these methods are objectionable in that the low yields usually are obtained.

The purpose of this invention is to provide a new and useful method of preparing thiophenealdehyde and the aldehydes of various substituted thiophenes. A further purpose of this invention is to provide a novel method of preparing high yields of the various thiophenealdehydes.

In accordance with this invention, the thiophenealdehydes are prepared by reacting thiophene, or a substituted thiophene with phosphorus oxychloride and an N,N-disubstituted formamide, for example diethyl formamide, dibutyl formamide, formpiperidide, N-ethyl formanilide, or N-methyl-p-formtoluidide. The reaction is preferably conducted under anhydrous conditions in solution in a suitable organic solvent, for example toluene, benzene or xylene. After the reagents are mixed, the resulting solution is heated to reflux temperatures for sufficient time to complete the reaction, at which time the reaction mass is poured into cold water or ice, and separated by suitable distillation. An effective separation may be achieved by steam distillation, whereby the major portion of the thiophenealdehyde is collected in the nonaqueous layer of the distillate. A portion of the thiophenealdehyde is dissolved in the aqueous layer and improved yields are achieved by extracting the water solution with toluene, or another water immiscible solvent for the thiophenealdehyde. The nonaqueous layer and the extracts may then be distilled to separate the thiophenealdehyde.

By this method, thiophenealdehyde may be prepared in unusually pure state and in very substantial yields. In addition to thiophenealdehyde, various substituted thiophenealdehydes may also be prepared. The useful thiophenealdehydes prepared in accordance with this invention are represented by the following structural formula:

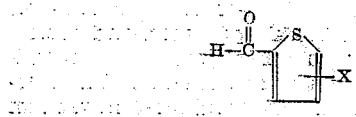

wherein X is a radical of the group consisting of hydrogen, halogen and alkyl radicals. Suitable halogen substituents include iodine, and fluorine, although bromine and chlorine are the most important. Although any alkyl substituted thiophenealdehyde may be prepared, those having from one to four carbon atoms in the alkyl group are the most useful, for example methyl, ethyl, isopropyl, n-propyl, isobutyl, n-butyl and t-butyl.

Further details of the preparation of thiophenealdehyde and the new substituted thiophenealdehydes are set forth with respect to the following specific examples.

Example 1

A 1000 ml., 3-necked flask was provided with an efficient stirrer, a thermometer and a reflux condenser sealed by means of a calcium chloride tube. The flask was charged with 135 grams of N-methyl formanilide and then, while cooling on a water bath, 153.4 grams of phosphorus oxychloride was added. The water bath was then removed and the mixture stirred for one hour. A solution of 126 grams of thiophene in 300 cc. of anhydrous toluene was then added and the entire mass boiled at reflux temperatures for one and one-half hours. The reaction mass was then cooled and poured into an equal volume of crushed ice. The mixture was then steam distilled and the aqueous portion of the condensate extracted three times with toluene. The extracts were then combined with the nonaqueous layer of condensate. The product distilled at 85° to 86° C. at 16 mm. total pressure and was identified as 2-thiophenealdehyde.

Example 2

The procedure of Example 1, was repeated except that dimethylformamide was used in place of the N-methyl formanilide. The compound formed was also identified as 2-thiophenealdehyde.

Example 3

The procedure of Example 1 was repeated and 67.5 grams of N-methyl formanilide, 76.7 grams of phosphorus oxychloride and 49 grams of 2-methylthiophene dissolved in 150 cc. of anhydrous benzene were reacted. The resulting product was identified as 5-methyl-2-thiophenealdehyde.

Example 4

Using a procedure similar to that described in Example 1, 67.5 grams of N-methyl formanilide, 76.7 grams of phosphorus oxychloride and a solution of 59.3 grams of 2-chlorothiophene in 100 cc. of anhydrous benzene were reacted. In this reaction, the reagents were combined without cooling and were boiled at reflux temperature for two hours. The final fractionation produced the compound identified as 5-chloro-2-thiophene-aldehyde.

The various thiophenealdehydes produced in accordance with the method of this invention are useful intermediates in the preparation of a wide variety of organic compounds. The following examples describe in detail various types of reactions by which new and useful chemical compounds are prepared.

*Example 5*

A solution of 27.5 grams of p-aminophenol in 200 cc. of ethanol and 28.3 grams of 2-thiophenealdehyde were charged to a reaction flask provided with a stirring mechanism and a reflux condenser. The mixture was heated at reflux temperature for fifteen minutes while being vigorously stirred. The heating was then discontinued and the mixture was stirred for an additional fifteen minutes. The flask was then cooled and a crystalline precipitate was obtained. After filtration, the crystalline material was washed with ethanol and dried in a vacuum desiccator over potassium hydroxide. Three successive crystallizations from ethanol produced a crystalline material identified as 2-thenal-p-aminophenol.

*Example 6*

A 2-liter, 3-necked flask was fitted with a stirring device, a thermometer and a reflux condenser. The flask was charged with 40.5 grams of 2-thenal-p-aminophenol, 18 grams of magnesium chips and 750 cc. of anhydrous methanol. The mixture was vigorously stirred and the temperature gradually rose to 32° C. after which it was cooled periodically by immersion in an ice bath. After twenty minutes, the reaction was accelerated and it was necessary to maintain the flask in an ice bath to keep the temperature below 32° C. After one hour, all of the magnesium had dissolved and the reaction mass was then heated and 500 cc. of methanol was evaporated. The residue was then poured in to 500 cc. of 5 percent aqueous sodium hyroxide while vigorously stirring the reaction mass. During this addition, the flask was immersed in an ice bath. The reaction mass was then diluted with 250 cc. of 5 percent sodium hydroxide and filtered. The gelatinous mass so separated was mixed with an additional 150 cc. of 5 percent sodium hydroxide and filtered. The combined filtrations and washing were then treated with carbon dioxide and filtered. The filtrate was then cooled and a solid material obtained, which after four successive crystallizations from methanol, was found to have a melting point of 107 to 108° C., and was identified as 2-thenyl-p-aminophenol.

*Example 7*

A reaction flask charged with a solution of 13.2 grams of sodium hydroxide in 120 cc. of water and 60 cc. of ethanol. While maintaining the solution at 12° C. by means of an ice bath, 31.2 grams of acetophenone was added with vigorous stirring. Thereafter, 29.0 grams of 2-thiophenealdehyde was added and the mixture stirred at 25° C. for three hours. Upon standing, a crystalline material was separated, washed free of alkali with water, and then with 100 cc. of 50 percent aqueous ethyl alcohol. After four successive crystallizations from ethanol, a crystalline material having a melting point of 59° C. was obtained and identified as 2-thenalacetophenone.

*Example 8*

Using the procedure described in the preceding example, except that p-methoxyacetophenone was used in place of the acetophenone, the solid compound so obtained was identified as 2-thenal-p-methoxyacetophenone.

*Example 9*

A reaction flask was charged with 11.2 grams of thiophenealdehyde, 22.7 grams of 2,4,6-trinitrotoluene, 1 cc. of piperidine and 100 cc. of xylene. The reaction mass was heated at reflux for fifteen minutes and 1.9 cc. of water was removed from the condensate in a Dean and Stark trap. Upon cooling, the reaction mass crystallized and was separated by filtration after diluting with 25 cc. of benzene. An additional crop of crystals was obtained by diluting the filtrate with hexane and cooling. The combined precipitates were dissolved in 200 cc. of benzene, decolorized by heating with activated charcoal, filtered while hot, diluted with an equal volume of hexane, and cooled. An orange colored crystalline solid, thereby obtained, was separated by filtration and dried. The resulting product was identified as a mixture of the cis- and trans-isomers of 1-(2'-thienyl)-2-(2,4,6-trinitrophenyl) ethylene.

*Example 10*

A mixture of 12.3 grams of rhodanine, 10.3 grams of 2-thiophenaldehyde, 20 grams of anhydrous sodium acetate, and 100 cc. of glacial acetic acid was charged to a reaction flask and boiled at reflux temperance for twenty minutes. Upon cooling, 250 cc. of water was added and the precipitate, so obtained, separated by filtration, washed with water, and dried in a vacuum desiccator in the present of potassium hydroxide. The resulting solid substance, after recrystallization from glacial acetic acid solution, was identified as 5-(2'-thenal)-2-thio-2,4-(1,3)-thiazolinedione.

*Example 11*

A reaction flask was charged with 31.3 grams of o-aminothiophenol and 75 cc. of pyridine. The flask was then charged gradually, while vigorously stirring, with 28 grams of 2-thiophenealdehyde. The mixture was then stirred for one-half hour at 85 to 95° C., cooled in an ice bath, and acidified with dilute hydrochloric acid. An oily substance separated and soon solidified. The solid matter was separated by filtration, washed with water and dried over potassium hydroxide. Three successive crystallizations of the product, from an ethanol solution in an atmosphere of carbon dioxide, produced a substantial yield of a compound identified as 2-(2'-thienyl)-benzothiazoline.

*Example 12*

A solution of 31.5 grams of the compound, prepared in accordance with the preceding example, in 200 cc. of warm ethanol was charged to a reaction flask, and then a solution of 26 grams of ferric chloride in 50 cc. of ethanol was gradually added over a period of one-half hour. The mixture was cautiously warmed for one-half hour, diluted with 100 cc. of water, and cooled. The thick slurry so obtained was diluted with a 300 cc. portion of water and filtered. The residue was washed with water and dried in vacuum over potassium hydroxide and sulfuric acid. After recrystallizing the product twice from ethanol, it was found to have a melting point of 98 to 99° C. and was identified as 2-(2'-thienyl)-benzothiazole.

The invention is defined by the following claims.

We claim:

1. A method of preparing a thiophenealdehyde, which comprises reacting a thiophene having the structural formula:

wherein X is a radical of the group consisting of hydrogen, halogen and alkyl radicals, with an N,N-disubstituted formamide and phosphorus oxychloride, in an anhydrous medium and separating the resulting product.

2. A method of preparing thiophenealdehyde, which comprises reacting thiophene with an N,N-disubstituted formamide and phosphorus oxychloride, in an anhydrous solution and separating the resulting product.

3. A method of preparing thiophenealdehyde, which comprises reacting thiophene, in an anhydrous solution, with N-methyl formanilide and phosphorus oxychloride, and separating the resulting product.

4. A method of preparing 5-methyl-2-thiophenealdehyde, which comprises reacting in an anhydrous solution, 2-methylthiophene with N-methyl formanilide and phosphorus oxychloride, and separating the resulting product.

5. A method of preparing 5-chloro-2-thiophenealdehyde, which comprises reacting in an anhydrous solution, 2-chlorothiophene with N-methyl formanilide and phosphorus oxychloride, and separating the resulting product.

WILLIAM S. EMERSON.
TRACY M. PATRICK, Jr.

REFERENCES CITED

The following references are of record in the file of this patent:

FOREIGN PATENTS

| Number | Country | Date |
|--------|---------|------|
| 514,415 | Germany | Dec. 13, 1930 |
| 519,444 | Germany | Feb. 28, 1931 |

OTHER REFERENCES

Bernthsen and Sudborough: Organic Chemistry, page 549, Van Nostrand, N. Y., 1922 edition.

Whitmore: Organic Chemistry, 884, 893, Van Nostrand, N. Y., 1937.

Richter: Organic Chemistry, pages 649-650, Wiley, N. Y., 1938.

Alles: J. Pharm. Exp. Ther. 72, 265 (1941).

Seemann: Canadian Journal of Research, vol. 19, sec. B, page 291 (1941).

Steinkopf: Die Chemie des Thiophens, page 21, Steinkopf, Dresden, 1941, Edwards Lithoprint 1944.

Powers, Advancing Fronts in Chemistry, vol. II, page 33, Reinhold Pub. Co., N. Y., 1946.

Williams, Detoxication Mechanisms, pages 194, 197, 198, Wiley, N. Y., 1947.

Caesar and Sachanen: Ind. Eng. Chem. 40, 922 (1948, May).

King and Nord: J. Organic Chem. 13, 635-640 (1948).

Ex parte Bywater and Coleman 83 U. S. P. Q. 4.